United States Patent [19]
Bareis et al.

[11] Patent Number: 5,496,124
[45] Date of Patent: Mar. 5, 1996

[54] TENSIONING ASSEMBLY

[75] Inventors: Alfred Bareis, Uhingen; Wilfried Abt, Rechberghausen; Rudolf Augst, Heiningen; Robert Czapka, Eislingen; Horst Pfisterer, Göppingen, all of Germany

[73] Assignee: L. Schuler GmbH, Goeppingen, Germany

[21] Appl. No.: 266,782

[22] Filed: Jun. 28, 1994

Related U.S. Application Data

[63] Continuation of Ser. No. 967,114, Oct. 27, 1992, abandoned.

[30] Foreign Application Priority Data

Nov. 2, 1991 [DE] Germany ............... 41 36 216.0

[51] Int. Cl.[6] ....................................... F16D 1/00
[52] U.S. Cl. ................................. 403/15; 403/374
[58] Field of Search ....................... 403/15, 335, 337, 403/367, 370, 373, 374, 314

[56] References Cited

U.S. PATENT DOCUMENTS

| | | | |
|---|---|---|---|
| 2,817,142 | 12/1957 | Boden | 403/15 |
| 3,434,303 | 3/1969 | Leyer | 403/314 |
| 3,782,841 | 1/1974 | Winckelhaus | 403/373 |
| 4,460,289 | 7/1984 | Lundgren | 403/374 |
| 4,471,846 | 9/1984 | Mullenberg . | |
| 4,906,124 | 3/1990 | Hogue | 403/370 |

FOREIGN PATENT DOCUMENTS 1557487  12/1979  United Kingdom .

*Primary Examiner*—P. Austin Bradley
*Assistant Examiner*—James Miner
*Attorney, Agent, or Firm*—Evenson, McKeown, Edwards & Lenahan

[57] ABSTRACT

A tensioning assembly having a cylindrical exterior circumferential surface of a drivable shaft section and an interior cone ring having a cylindrical interior circumferential surface arranged on the cylindrical exterior circumferential surface, the interior cone ring having a conical exterior circumferential surface. An exterior cone ring is arranged on the conical exterior circumferential surface of the interior cone ring, the exterior cone ring having tensioning screws which are coaxial with respect to the drivable shaft section and by which the interior and exterior cone rings are tensioned with one another and the interior cone ring is tensioned with the drivable shaft section. To provide a tensioning assembly that is easily mounted and relaxed without loosening of the tensioning screws, a driven sleeve is arranged on the shaft section and is coupled to a driven element, the driven sleeve having an axial length that is larger than an axial length of the interior and exterior cone rings by the axial length of the driven element. Grooves are provided in at least one of the cylindrical circumferential surfaces, the grooves admitting a liquid pressure medium to the pairing of the cylindrical interior and exterior circumferential surfaces. The admission of pressure medium to the pairing of the cylindrical interior and exterior surfaces acts as a hydraulic release system for the tensioning between the shaft section and the driven sleeve.

17 Claims, 4 Drawing Sheets

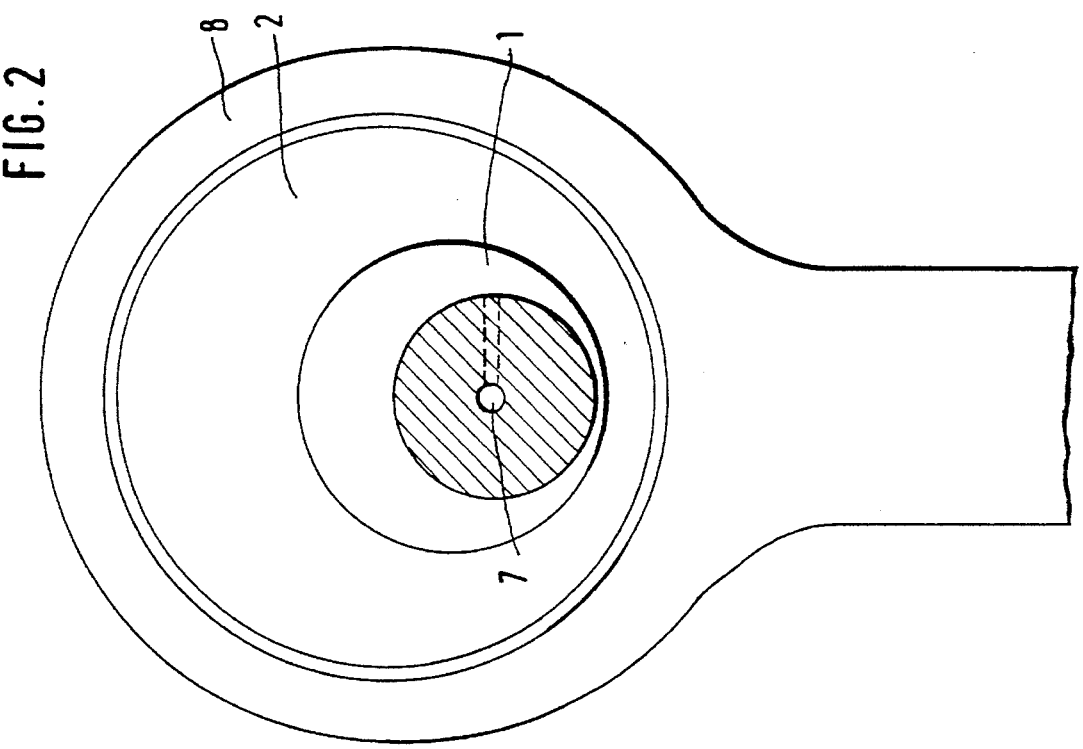
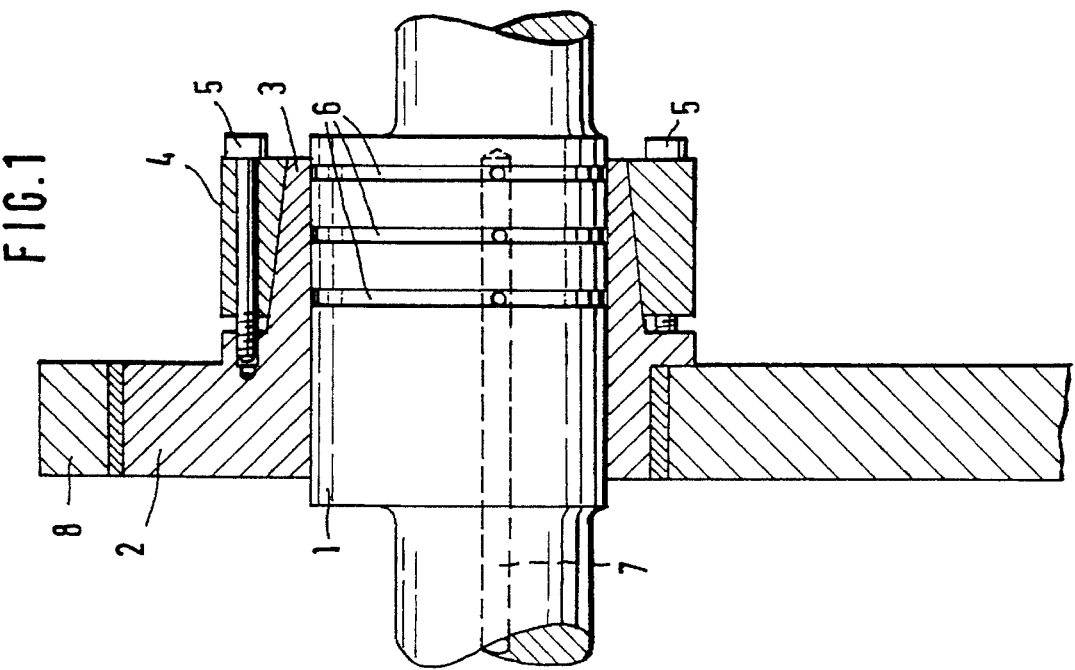

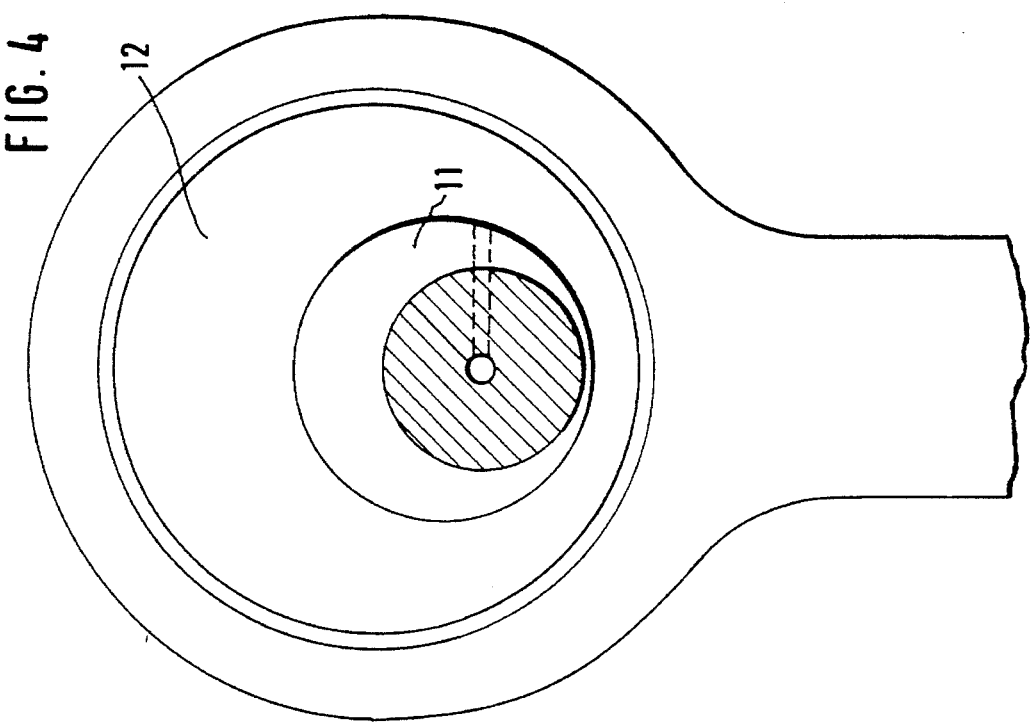
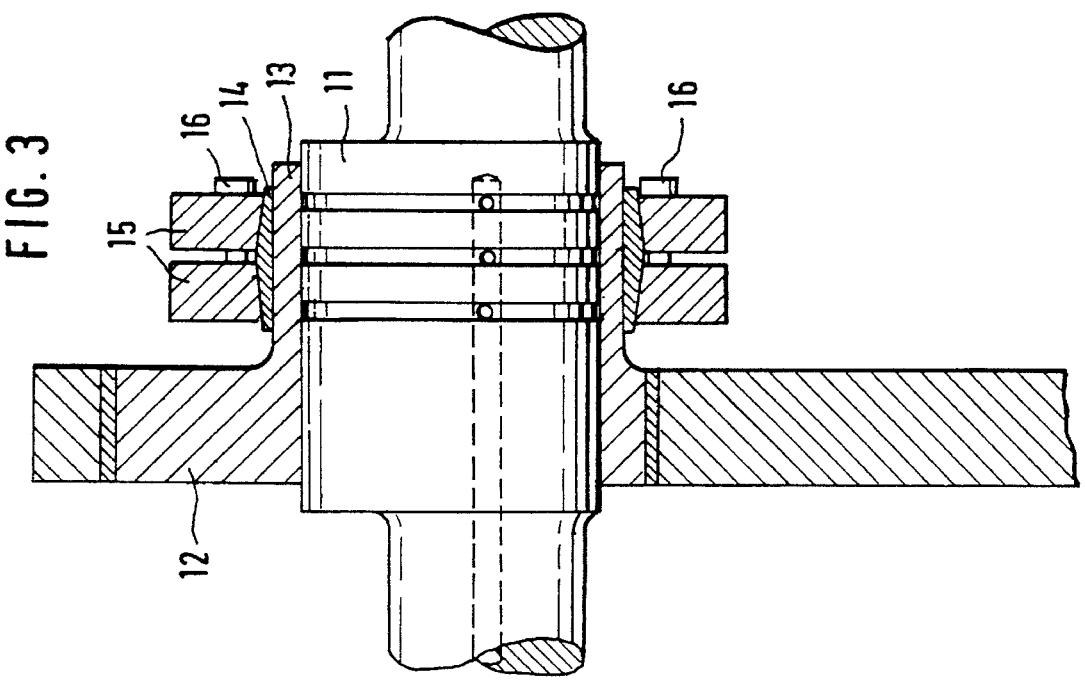

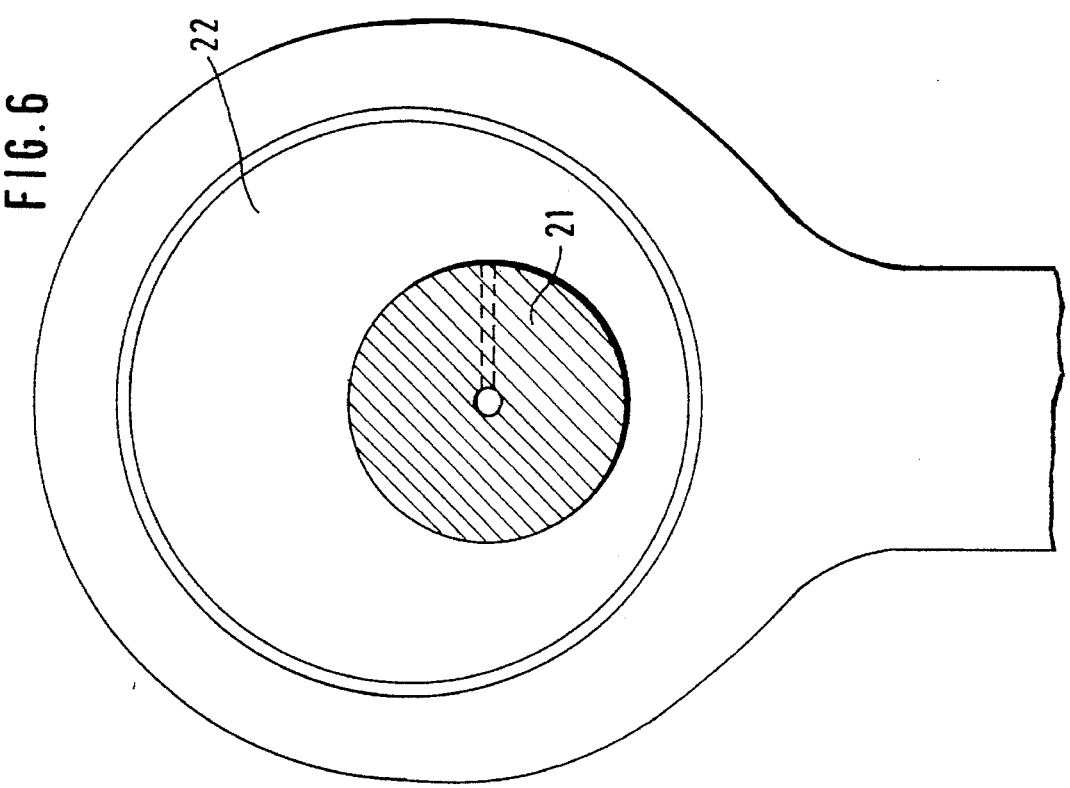
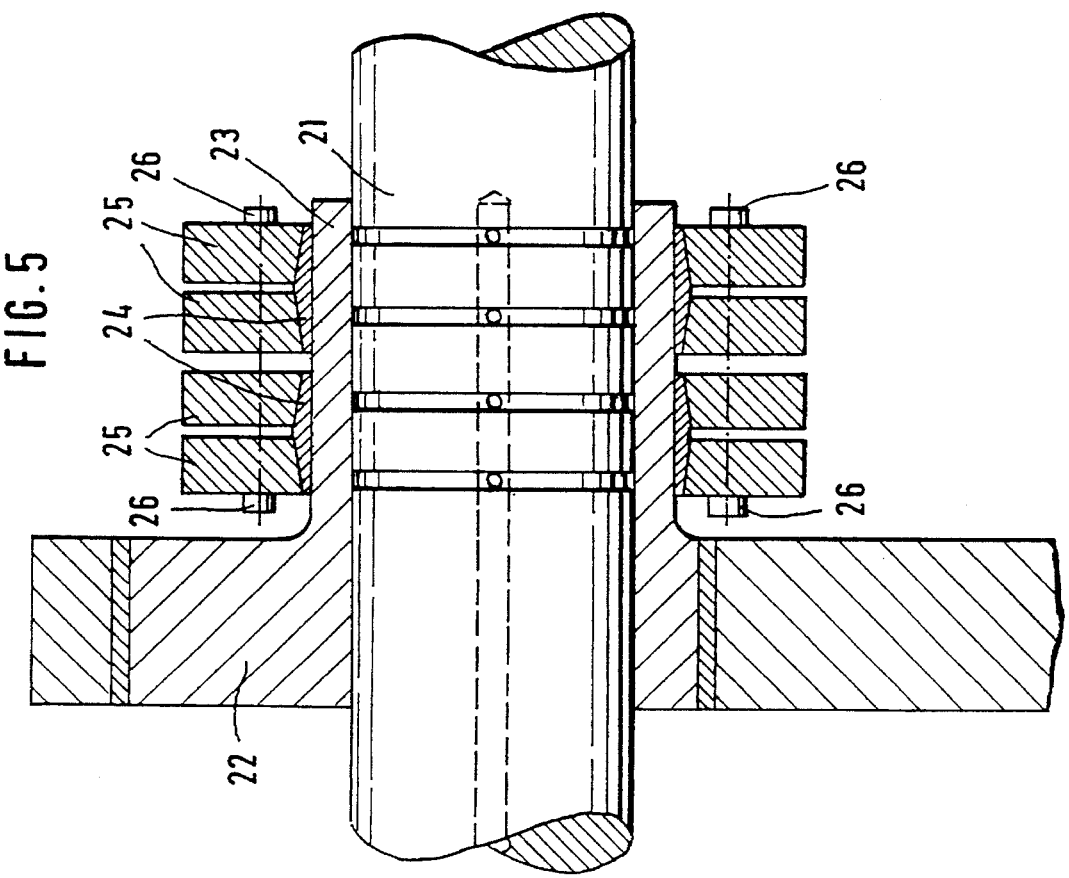

TENSIONING ASSEMBLY

This application is a continuation of application Ser. No. 07/967,114 filed on Oct. 27, 1992, now abandoned.

BACKGROUND AND SUMMARY OF THE INVENTION

The present invention relates to a tensioning assembly whose interior cone ring is disposed by means of its cylindrical interior circumferential surface directly or indirectly on a cylindrical exterior circumferential surface of a drivable shaft section, and whose exterior cone ring is disposed on the conical exterior circumferential surface of the interior cone ring, comprising tensioning screws which are coaxial with respect to the shaft section and by means of which the cone rings can be tensioned with one another and the interior cone ring can be tensioned with the shaft section, the admitting of a liquid pressure medium to the pairing of the cylindrical interior/exterior circumferential surfaces being possible, this liquid pressure medium flowing in grooves provided in at least one of these cylindrical surfaces.

A known tensioning assembly of this type, such as shown in German Patent Document DE-PS 33 05 538, has the purpose of tensioning on the shaft section in a torque transmitting manner an exterior component, such as the hub of a belt driving drum. The axial length of the tensioning assembly and particularly of its cone rings in this known assembly is equal to or smaller than the axial length of the exterior component which surrounds the shaft section. The liquid pressure medium is admitted not only to a pairing of cylindrical interior/exterior circumferential surfaces but also to a pairing of interacting conical interior/exterior circumferential surfaces of the cone rings for the purpose of reducing the frictional resistances in the pairings of the surfaces that are acted upon. Thus, by means of lower axial forces in the tensioning screws, larger radial tension forces of the tensioning assembly are applied between the shaft section and the exterior component and this permits a higher torque to be transmitted.

An object of the invention is to provide a tensioning assembly, which is easy to mount, for the torque-transmitting fastening of a driven element arranged axially next to the cone rings on the shaft section, and which, without any loosening of the tensioning screws can be relaxed on the shaft section for the purpose of changing the angular position of the driven element.

This and other objects are achieved by the present invention which provides a tensioning assembly comprising a cylindrical exterior circumferential surface of a drivable shaft section and an interior cone ring having a cylindrical interior circumferential surface arranged on the cylindrical exterior circumferential surface, the interior cone ring having a conical exterior circumferential surface. An exterior cone ring is arranged on the conical exterior circumferential surface of the interior cone ring, the exterior cone ring having tensioning screws which are coaxial with respect to the drivable shaft section and by which the interior and exterior cone rings are tensioned with one another and the interior cone ring is tensioned with the drivable shaft section. A driven sleeve is arranged on the shaft section and is coupled to a driven element, the driven sleeve having an axial length that is larger than an axial length of the interior and exterior cone rings by the axial length of the driven element. Grooves are provided in at least one of the cylindrical circumferential surfaces, the grooves admitting a liquid pressure medium to the pairing of the cylindrical interior and exterior circumferential surfaces. The admission of pressure medium to the pairing of the cylindrical interior and exterior surfaces acts as a hydraulic release system for the tensioning between the shaft section and the driven sleeve.

With the present invention, it is sufficient for the grooves used for the supply of liquid pressure medium to be arranged only in the axial areas of the cone rings since the operating of the hydraulic release system is required only in these areas. The other sections of the driven sleeve are untensioned and can therefore be rotated on the shaft section in any event.

In a particularly elegant embodiment of the tensioning assembly, which normally required a single-piece construction, at least one section of the driven sleeve is situated axially outside the driven element, and is itself constructed as an interior cone ring, on which the exterior cone ring is then arranged.

In certain embodiments, series-produced cone rings are used in which at least one interior cone ring is arranged on at least one axially exterior section of the driven sleeve which is situated axially outside the driven element.

A possibility of applying the tensioning assembly is obtained when the driven element is constructed as an eccentric on which a connecting rod may be disposed. By the adjustment of the angular position of the eccentric with respect to the shaft section, the position of the stroke of the apparatus actuated by the connecting rod can be adjusted with respect to the angular position of the shaft section.

The same effect can be achieved by the application of the tensioning assembly when the driven element is constructed as a toothed wheel with which a gear or a toothed belt mates.

Other possibilities of applying the tensioning assembly are obtained by certain embodiments in which the shaft section is constructed as an eccentric and the driven sleeve is constructed as an eccentric bushing. As a result, the size and the position of the resulting eccentricity can be adjusted. Therefore, the stroke of an apparatus driven by a connecting rod disposed on the eccentric bushing can be adjusted.

When large torques are to be transmitted, certain embodiments are particularly advantageous in which the interior cone ring is a double cone ring with opposed conical shapes and the exterior cone ring is composed of two separate, axially spaced partial rings.

For the same purpose, in certain embodiments, a plurality of double cone rings are arranged axially next to one another on at least one section of the driven sleeve situated axially outside the driven element.

For receiving several interior cone rings, in certain embodiments, sections of the driven sleeve which are situated axially outside the driven element may also be provided axially on both sides of the driving element.

Other objects, advantages and novel features of the present invention will become apparent from the following detailed description of the invention when considered in conjunction with the accompanying drawings.

BRIEF DESCRIPTION OF THE DRAWINGS

FIG. 1 is a sectional view of a tensioning assembly, constructed in accordance with an embodiment of the present invention, for the fastening of an eccentric bushing on an eccentric.

FIG. 2 is a view in the axial direction with respect to FIG. 1.

FIG. 3 is a sectional view of another embodiment of a tensioning assembly for the fastening of an eccentric bushing on an eccentric.

FIG. 4 is a view in the axial direction with respect to FIG. 3.

FIG. 5 is a sectional view of another embodiment of a tensioning assembly for the fastening of an eccentric on a shaft section.

FIG. 6 is a view in the axial direction with respect to FIG. 5.

DETAILED DESCRIPTION OF THE DRAWINGS

Figure 7:
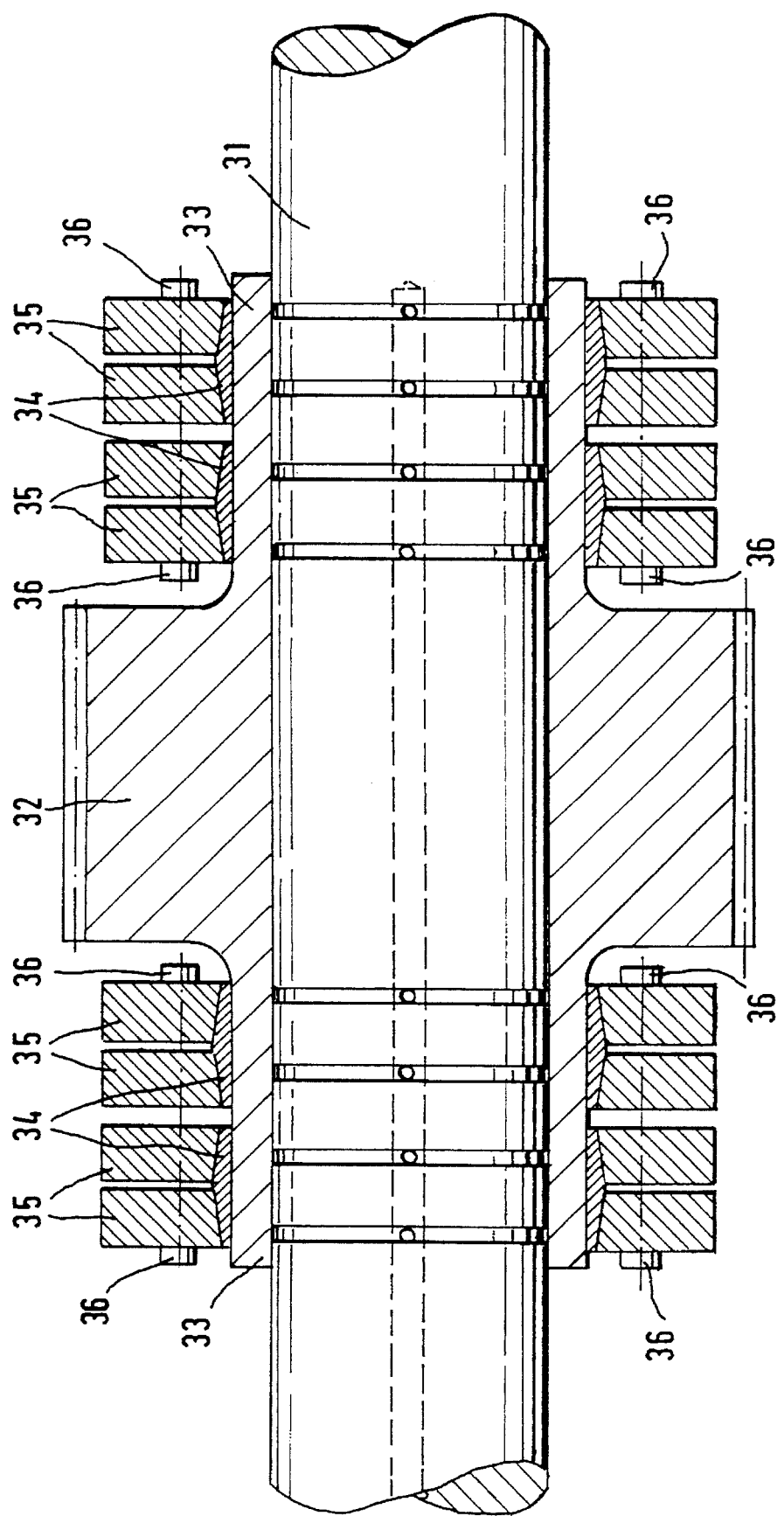
FIG. 7 is a sectional view of an embodiment of a tensioning assembly for the transmission of particularly large torques to a toothed wheel.

In the embodiment of the present invention according to FIGS. 1 and 2, a driven sleeve is arranged on the shaft section constructed as the eccentric 1. The driven sleeve includes an eccentric bushing 2 and a section constructed as an interior cone ring 3. On the interior cone ring 3, an exterior cone ring 4 is disposed which is tensioned with the interior cone ring 3 by means of tensioning screws 5, whereby the driven sleeve is tensioned on the eccentric 1. For the hydraulic release system, in the area of the interior cone ring 3, the cylindrical exterior circumferential surface of the eccentric 1 is provided with grooves 6 which can be acted upon via a central bore 7 by a liquid pressure medium. On the eccentric bushing 2, a connecting rod 8 is disposed which is used for the drive of an apparatus which is not shown.

In the embodiment according to FIGS. 3 and 4, a driven sleeve is arranged on the shaft section constructed as an eccentric and comprises an eccentric bushing 12 and a section 13 disposed next to it. An interior double-cone ring 14 with opposed conical shapes is arranged on section 13. On the double-cone ring 14, the two partial rings of an exterior double cone ring 15 are disposed which can be tensioned with respect to one another by tensioning screws 16. The grooves, a central bore and a connecting rod exist as in the case of the embodiment according to FIGS. 1 and 2.

In the embodiment according to FIGS. 5 and 6, a driven sleeve is arranged on the shaft section 21 and comprises an eccentric 22 and a section 23 disposed next to it. Two interior double cone rings 24 with opposed conical shapes are arranged on section 23. The two partial rings respectively of exterior double cone rings 25, which can be tensioned with respect to one another by means of tensioning screws 26, are disposed on these two interior double cone rings 24. The grooves, a central bore and a connecting rod exist as in the embodiments according to FIGS. 1, 2 and 3, 4.

In the embodiment according to FIG. 7, a driven sleeve is arranged on the shaft section 31 which comprises a toothed wheel 32 and sections 33 which are situated adjacent to it on both sides. Two interior double cone rings 34 respectively with opposed conical shapes are arranged on sections 33. The two partial rings respectively of the exterior double cone rings 35, which can be tensioned with respect to one another by tensioning screws 36, are disposed on these two interior double cone rings 34. The grooves and a central bore exist as in the other embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A tensioning assembly comprising:

a cylindrical exterior circumferential surface of a drivable shaft section;

a driven sleeve arranged on the shaft section, said driven sleeve including an interior cone ring having a cylindrical interior circumferential surface arranged on said cylindrical exterior circumferential surface, the interior cone ring having a conical exterior circumferential surface; and an exterior cone ring arranged on the conical exterior circumferential surface of the interior cone ring, the exterior cone ring having tensioning screws which are coaxial with respect to the drivable shaft section and by which the interior and exterior cone rings are tensioned with one another and the interior cone ring is tensioned with the drivable shaft section;

wherein said driven sleeve further includes a driven element, the driven sleeve having an axial length along the drivable shaft section which exceeds an axial length of the interior and exterior cone rings by at least an amount of the axial length of the driven element, wherein the driven element is located axially apart from the interior cone ring; and grooves provided in at least one of the cylindrical circumferential surfaces, the grooves admitting a liquid pressure medium only to the pairing of the cylindrical interior and exterior circumferential surfaces, with the admission of pressure medium to the pairing of the cylindrical interior and exterior surfaces acting as a hydraulic release system for the tensioning between the shaft section and the driven sleeve.

2. A tensioning assembly according to claim 1, wherein at least one section of the driven sleeve situated axially outside the driven element forms the interior cone ring.

3. A tensioning assembly according to claim 1, wherein least one interior cone ring is arranged on at said section of the driven sleeve situated axially outside the driven element.

4. A tensioning assembly according to claim 3, wherein the driven element is an eccentric.

5. A tensioning assembly according to claim 4, wherein the interior cone ring is a double cone ring with opposed conical shapes and the exterior cone ring is composed of two separate axially spaced partial rings.

6. A tensioning assembly according to claim 3, wherein the driven element is a toothed wheel which is adapted to mate with a gear or a toothed belt.

7. A tensioning assembly according to claim 6, wherein the interior cone ring is a double cone ring with opposed conical shapes and the exterior cone ring is composed of two separate axially spaced partial rings.

8. A tensioning assembly according to claim 3, wherein the shaft section is an eccentric and the driven sleeve is an eccentric bushing.

9. A tensioning assembly according to claim 8, wherein the interior cone ring is a double cone ring with opposed conical shapes and the exterior cone ring is composed of two separate axially spaced partial rings.

10. A tensioning assembly according to claim 1, wherein the driven element is an eccentric.

11. A tensioning assembly according to claim 1, wherein the driven element is a toothed wheel which is adapted to mate with a gear or a toothed belt.

12. A tensioning assembly according to claim 1, wherein the shaft section is an eccentric and the driven sleeve is an eccentric bushing.

13. A tensioning assembly according to claim 3, wherein sections of the driven sleeve which are situated axially outside the driven element are provided axially on both sides of the driven element.

14. A tensioning assembly according to claim 3, wherein the interior cone ring is a double cone ring with opposed conical shapes and the exterior cone ring is composed of two separate axially spaced partial rings.

15. A tensioning assembly according to claim 14, wherein a plurality of double cone rings are arranged axially next to one another on at least one section of the driven sleeve which is situated axially outside the driven element.

16. A tensioning assembly according to claim 15, wherein sections of the driven sleeve which are situated axially outside the driven element are provided axially on both sides of the driven element.

17. A tensioning assembly according to claim 14, wherein sections of the driven sleeve which are situated axially outside the driven element are provided axially on both sides of the driven element.

* * * * *